(12) United States Patent  (10) Patent No.: US 9,170,834 B2
Beda et al.  (45) Date of Patent: Oct. 27, 2015

(54) METADATA-BASED VIRTUAL MACHINE CONFIGURATION

(71) Applicant: Google Inc., Mountain View, CA (US)

(72) Inventors: Joseph S. Beda, Seattle, WA (US); Craig I. McLuckie, Sammamish, WA (US); Christopher L. Eck, Sammamish, WA (US); Martin R. Gannholm, Seattle, WA (US); Evan K. Anderson, Seattle, WA (US); Mathew A. Mills, Seattle, WA (US)

(73) Assignee: Google Inc., Mountain View, CA (US)

( * ) Notice: Subject to any disclaimer, the term of this patent is extended or adjusted under 35 U.S.C. 154(b) by 164 days.

(21) Appl. No.: 13/665,890

(22) Filed: Oct. 31, 2012

(65) Prior Publication Data

US 2014/0123136 A1    May 1, 2014

(51) Int. Cl.
*G06F 9/455* (2006.01)
*G06F 17/30* (2006.01)

(52) U.S. Cl.
CPC ...... *G06F 9/45558* (2013.01); *G06F 17/30103* (2013.01); *G06F 17/30112* (2013.01); *G06F 17/30525* (2013.01)

(58) Field of Classification Search
None
See application file for complete search history.

(56) References Cited

U.S. PATENT DOCUMENTS

| | | | |
|---|---|---|---|
| 6,208,988 B1* | 3/2001 | Schultz | 1/1 |
| 6,678,695 B1* | 1/2004 | Bonneau et al. | 1/1 |
| 2004/0128670 A1 | 7/2004 | Robinson et al. | |
| 2005/0044233 A1 | 2/2005 | Cai et al. | |
| 2008/0104586 A1* | 5/2008 | Thorton et al. | 718/1 |
| 2011/0179412 A1* | 7/2011 | Nakae et al. | 718/1 |
| 2011/0191772 A1 | 8/2011 | Larimore et al. | |
| 2012/0110572 A1* | 5/2012 | Kodi et al. | 718/1 |
| 2012/0151477 A1 | 6/2012 | Sinha et al. | |
| 2012/0221639 A1* | 8/2012 | Mallet et al. | 709/204 |
| 2014/0047440 A1* | 2/2014 | Da Silva et al. | 718/1 |
| 2014/0082350 A1* | 3/2014 | Zarfoss et al. | 713/155 |

OTHER PUBLICATIONS

International Search Report and Written Opinion in International Application No. PCT/US2013/067507, mailed Sep. 25, 2014, 12 pages.

* cited by examiner

*Primary Examiner* — Emerson Puente
*Assistant Examiner* — Jonathan R Labud
(74) *Attorney, Agent, or Firm* — Fish & Richardson P.C.

(57) ABSTRACT

Methods, systems, and apparatus, including computer programs encoded on computer storage media, for associating one or more of a plurality of metadata collections with one or more respective identifiers, wherein each metadata collection includes one or more pairings of metadata attributes with metadata values, and wherein each identifier is one of a project identifier, a tag identifier or an instance identifier; identifying, based on identifier information associated with a virtual machine instance, one or more metadata values to be provided to the virtual machine instance, wherein the identifier information specifies one or more of a project identifier, a tag identifier and an instance identifier, and wherein each identified metadata value belongs to a metadata collection associated with an identifier that is specified in the identifier information; and providing, to the virtual machine instance, the identified one or more metadata values.

27 Claims, 4 Drawing Sheets

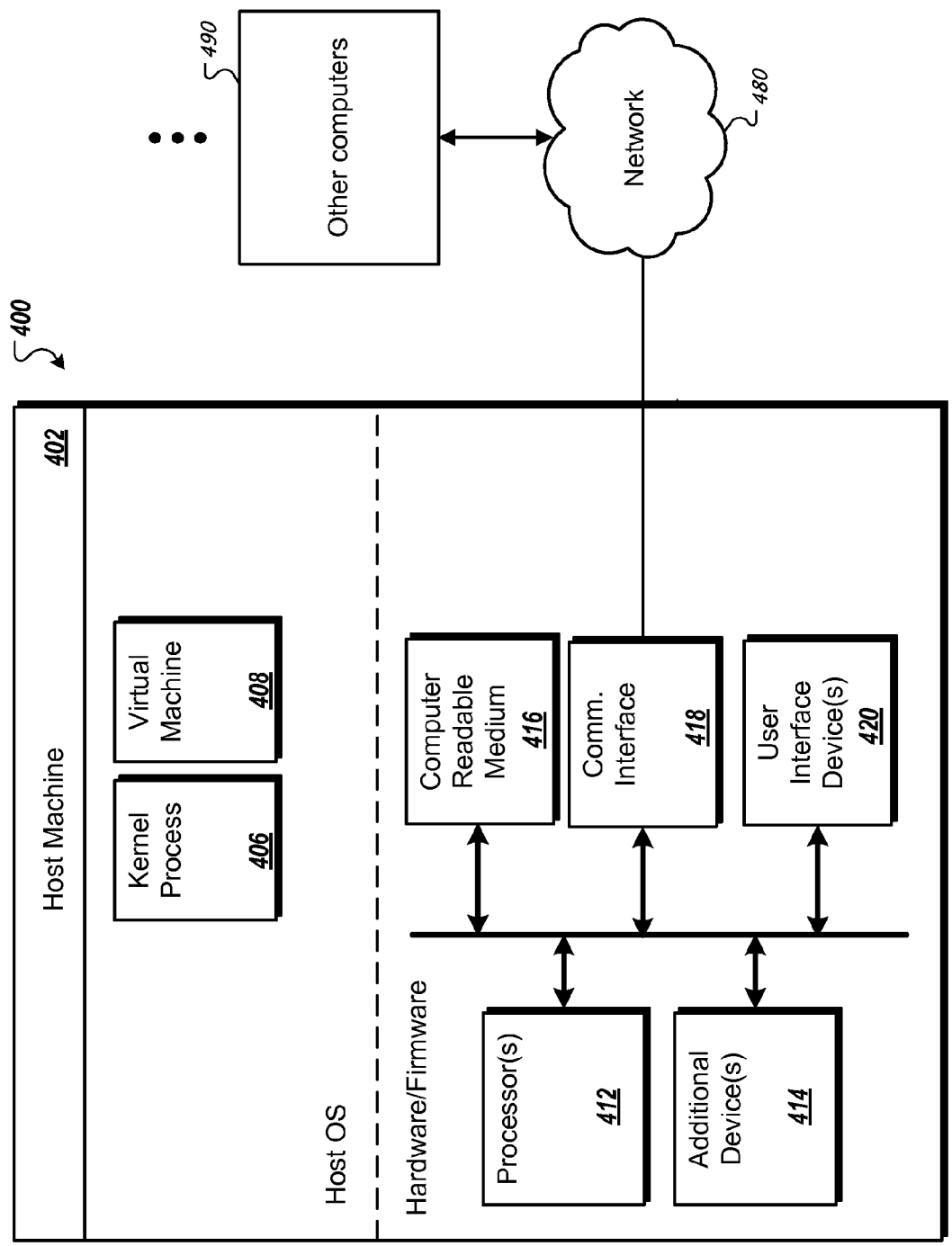

METADATA-BASED VIRTUAL MACHINE CONFIGURATION

BACKGROUND

This specification relates to cloud computing.

Cloud computing is network-based computing in which typically large collections of servers housed in data centers or "server farms" provide computational resources and data storage as needed to end users. Some cloud computing services provide access to software applications such as word processors and other commonly used applications to end users who interface with the applications through web browsers or other client-side software. Users' electronic data files are usually stored in the server farm rather than on the users' computing devices. Maintaining software applications and user data on a server farm simplifies management of end user computing devices. Some cloud computing services allow end users to execute software applications in virtual machines.

SUMMARY

Users can define metadata, e.g., pairings of metadata attributes and metadata values, to be used in configuring virtual machine instances. As used in this specification, the terms pairings of metadata attributes with metadata values and metadata key-value pairs are used interchangeably. Each metadata key-value pair can be associated with one or more identifiers. The identifiers can include, for example, a project identifier that references a particular project with which one or more virtual machine instances are associated, an instance identifier that references a particular virtual machine instance, or a tag identifier that references a particular tag with which one or more virtual machine instances are associated. Each metadata key-value pair is stored in a metadata collection that is identified by a particular identifier. For example, a metadata key-value pair that is associated with a project identifier P1 and a tag identifier T1 is stored in both a first metadata collection that is identified by the project identifier P1 and a second metadata collection that is identified by the tag identifier T1.

When initializing virtual machine instances, users can associate each virtual machine instance with one or more identifiers, e.g., a project identifier, an instance identifier, or a tag identifier, as described above. Each virtual machine instance can obtain metadata, for example, from a metadata server. In some implementations, a virtual machine instance that is associated with particular identifiers can obtain metadata that is also associated with the particular identifiers. Each virtual machine instance can apply the obtained metadata key-value pairs to configure various settings associated with the respective virtual machine instance.

In general, one aspect of the subject matter described in this specification can be embodied in methods that include the actions of associating one or more of a plurality of metadata collections with one or more respective identifiers, wherein each metadata collection includes one or more pairings of metadata attributes with metadata values, and wherein each identifier is one of a project identifier, a tag identifier or an instance identifier; identifying, based on identifier information associated with a virtual machine instance, one or more metadata values to be provided to the virtual machine instance, wherein the identifier information specifies one or more of a project identifier, a tag identifier and an instance identifier, and wherein each identified metadata value belongs to a metadata collection associated with an identifier that is specified in the identifier information; and providing, to the virtual machine instance, the identified one or more metadata values. Other embodiments of this aspect include corresponding systems, apparatus, and computer program products.

These and other embodiments can optionally include one or more of the following features. The method further includes receiving, from the virtual machine instance, a metadata query that includes the identifier information; and identifying the one or more metadata values in response to receipt of the metadata query. The metadata query is communicated using a Hanging GET operation. The method further includes receiving data that includes one or more user specified identifiers and one or more user specified pairings of metadata values with metadata attributes; generating a metadata collection that includes the one or more user-specified pairings; and associating the generated metadata collection with the user specified identifier. The metadata collections include a first metadata collection and a second metadata collection, the first metadata collection being associated with a first identifier and including a pairing of a first metadata attribute with a first metadata value, and the second metadata collection being associated with a second identifier and including a pairing of the first metadata attribute with a second metadata value, the first metadata value being different from the second metadata value.

The method further includes providing both the first metadata value and the second metadata value to the virtual machine instance. The method further includes determining that the first metadata collection has a higher priority level than the second metadata collection based on an evaluation of the first identifier and the second identifier; and providing the first metadata value and not the second metadata value to the virtual machine instance. The first identifier is an instance identifier or a tag identifier and the second identifier is a project identifier or the first identifier is an instance identifier and the second identifier is a tag identifier or a project identifier. The method further includes receiving data specifying an identifier and a new pairing of a metadata attribute with a metadata value and updating the metadata collection associated with the identifier specified in the data to include the new pairing.

Particular embodiments of the subject matter described in this specification can be implemented so as to realize one or more of the following advantages. Virtual machine roles can be defined based on their respective tag identifiers. Users can specify metadata key-value pairs and the specified metadata key-value pairs can be used to collectively configure settings for one or more virtual machine instances. Settings and roles of virtual machine instances can be dynamically updated upon updating. Metadata can be associated with project identifiers or tag identifiers to simplify enforcement of common configurations and properties across multiple virtual machine instances. In cases when virtual machine instances do not access metadata associated with an instance identifier, or if access to the metadata is prohibited by policy, the auditing of virtual machine instances that use a standard configuration can be simplified.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 is a schematic diagram of an example host machine.

Like reference numbers and designations in the various drawings indicate like elements.

DETAILED DESCRIPTION

Figure 1:
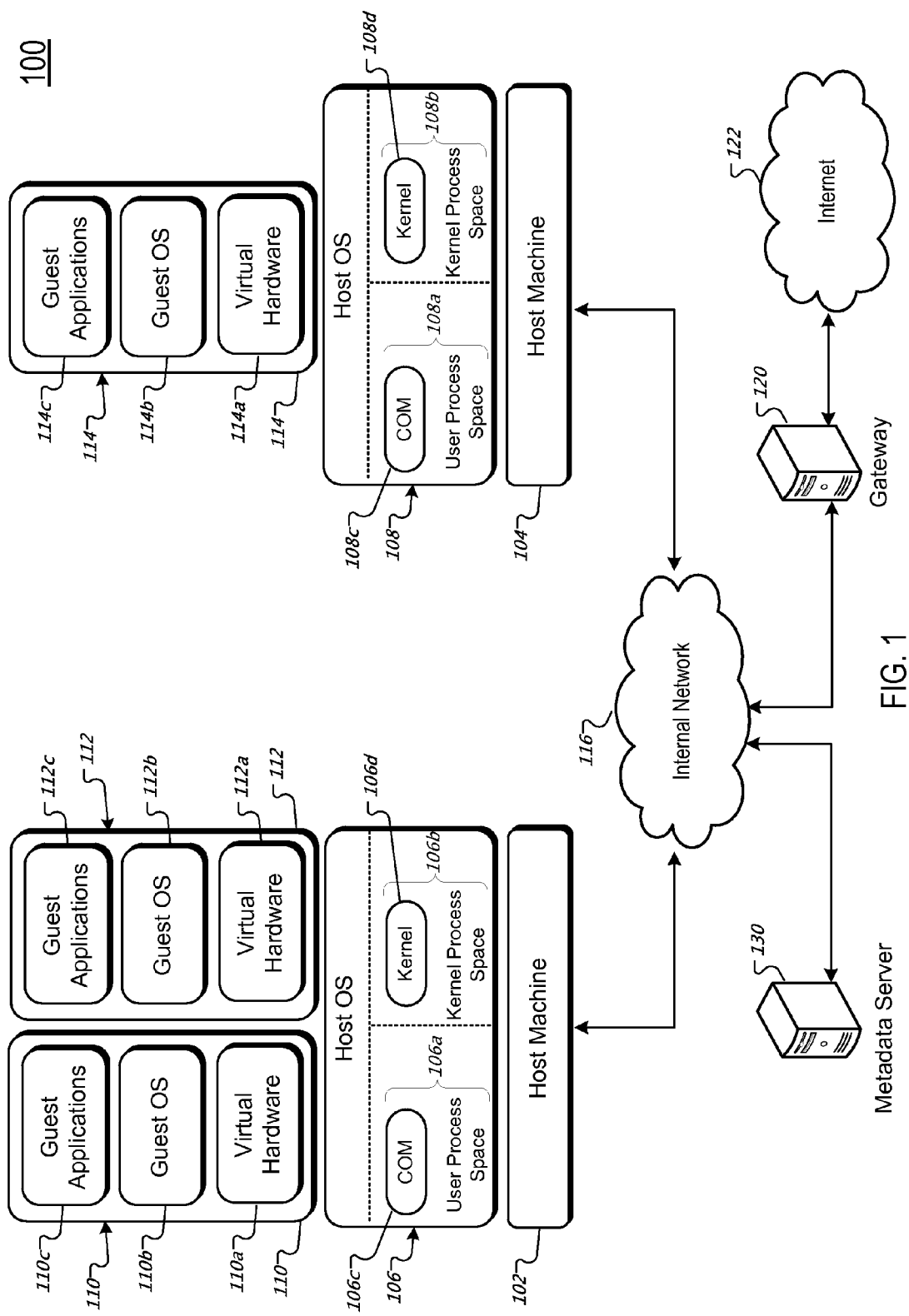
FIG. 1 is a schematic illustration of an example virtual machine system.

FIG. 1 is a schematic illustration of an example virtual machine system 100. The system 100 includes one or more host machines such as, for example, host machine 102 and host machine 104. Generally speaking, a host machine is one or more data processing apparatus such as rack mounted servers or other computing devices. The data processing apparatus can be in different physical locations and can have different capabilities and computer architectures. Host machines can communicate with each other through an internal data communications network 116. The internal network can include one or more wired, e.g., Ethernet, or wireless, e.g., WI-FI, networks, for example. In some implementations the internal network 116 is an intranet. Host machines can also communicate with devices on external networks, such as the Internet 122, through one or more gateways 120 which are data processing apparatus responsible for routing data communication traffic between the internal network 116 and the external network 122. Other types of external networks are possible.

Each host machine 102, 104, executes a host operating system 106, 108. A host operating system 106, 108, manages host machine resources. In this example, host operating systems 106, 108, run software, e.g. a virtual machine monitor ("VMM") or a hypervisor, that virtualizes the underlying host machine hardware and manages concurrent execution of one or more virtual machine ("VMs") instances. In this example, the host operating system 106 manages two VM instances, VM 110 and VM 112, while a different host operating system 108 manages a single VM 114. VM instances can be migrated from one host machine to another host machine. In addition, a single VM instance can be managed by multiple host machines. A host machine can, in general, manage multiple virtual machines, however, the quantity may be limited based on physical resources of the host machine.

Each VM instance provides an emulation of a physical hardware system which may, but need not, be based on the host machine hardware architecture. The simulated version of the hardware is referred to as virtual hardware, e.g., virtual hardware 110a, 112a, and 114a. Software that is executed by the virtual hardware is referred to as guest software. In some implementations, guest software cannot determine if it is being executed by virtual hardware or by a physical host machine. If guest software executing in a VM instance, or the VM instance itself, is compromised, malfunctions, or aborts, other VM instances executing on the host machine may not be affected. A host machine's microprocessor(s) can include processor-level mechanisms to enable virtual hardware to execute software applications efficiently by allowing guest software instructions to be executed directly on the host machine's microprocessor without requiring code-rewriting, recompilation, or instruction emulation.

Each VM instance, e.g., VMs 110, 112, and 114, is allocated a set of virtual memory pages from the virtual memory of the underlying host operating system and is allocated virtual disk blocks from one or more virtual disk drives for use by the guest software executing on the VM instance. For example, host operating 106 allocates memory pages and disk blocks to VM 110 and VM 112, and host operating system 108 does the same for VM 114. In some implementations, a given VM instance cannot access the virtual memory pages assigned to other VMs. For example, VM 110 cannot access memory pages that have been assigned to VM 112. A virtual disk drive can be persisted across VM instance restarts. Virtual disk blocks are allocated on physical disk drives coupled to host machines or available over the internal network 116, for example. In addition to virtual memory and disk resources, VM instances can be allocated network addresses through which their respective guest software can communicate with other processes reachable through the internal network 116 or the Internet 122. For example, guest software executing on VM 110 can communicate with guest software executing on VM 112 or VM 114. In some implementations, each VM instance is allocated one or more unique Internet Protocol (IP) version 4 or version 6 addresses. Other address schemes are possible. The VM instance IP addresses are addressable on the internal network 116 and, in some implementations, are addressable on the Internet 122 if the addresses are advertised using a suitable routing protocol, for instance.

A VM instance's guest software can include a guest operating system, e.g., guest operating systems 110b, 112b, and 114b, which is software that controls the execution of respective guest software applications, e.g., guest applications 110c, 112c, and 114c, within the VM instance and provides services to those applications. For example, a guest operating system could be a variant of the UNIX operating system. Other operating systems, e.g., Microsoft Windows, and different versions of these operating systems can be used as the guest operating system. Each VM instance can execute the same guest operating system or different guest operating systems. In further implementations, a VM instance does not require a guest operating system in order to execute guest software applications. A guest operating system's access to resources such as networks and virtual disk storage is controlled by the underlying host operating system.

By way of illustration, and with reference to virtual machine 110, when the guest application 110c or guest operating system 110b attempts to perform an input/output operation on a virtual disk, initiate network communication, or perform a privileged operation, for example, the virtual hardware 110a is interrupted so that the host operating system 106 can perform the action on behalf of the virtual machine 110. The host operating system 106 can perform these actions with a process that executes in kernel process space 106b, user process space 106a, or both.

The kernel process space 106b is virtual memory reserved for the host operating system 106's kernel 106d which can include kernel extensions and device drivers, for instance. The kernel process space has elevated privileges, sometimes referred to as "supervisor mode"; that is, the kernel 106d can perform certain privileged operations that are off limits to processes running in the user process space 106a. Examples of privileged operations include access to different address spaces, access to special functional processor units in the host machine such as memory management units, and so on. The user process space 106a is a separate portion of virtual memory reserved for user mode processes. User mode processes cannot perform privileged operations directly.

In various implementations, a portion of VM instance network communication functionality is implemented in a communication process, e.g., communication process 106c. In some implementations, the communication process executes in the user process space, e.g., user process space 106a, of a host operating system, e.g., host operating system 106. In other implementations, the communication process can execute in the kernel process space, e.g., kernel process space 106d of the host operating system. In yet further implementations, some portion of the communication process executes in the user process space and another portion executes in the kernel process space.

The system 100 includes a metadata server 130 that manages and provides access to metadata for VM instances in the system 100. The metadata server 130 can be implemented as one or more computer programs installed on one or more computers in system 100. The metadata server 130 can, for example, be installed on a particular host machine. The metadata server 130 can also be implemented as a VM instance in the system 100. Generally, the metadata server 130 is located in the same datacenter as VM instances that the metadata server 130 services, although the metadata server 130 can also be located elsewhere and be, for example, accessible over the Internet.

Metadata can be written to and read from the metadata server 130 using any appropriate network communications protocol. In some implementations, the read and write commands are implemented using conventional hypertext transfer protocol (HTTP) "GET" and "PUT" commands. In some implementations, users can provide custom metadata to the metadata server 130 using an Application Programming Interface (API).

Each element of metadata is a key-value pair. The key, or attribute, uniquely identifies a type of metadata. The value can be one or more pieces of data, for example, text strings. For example, a user can specify a metadata key "hostname" and a corresponding metadata value "myinst.myproject.mydomain.internal." Users can also associate each key-value pair with one or more respective identifiers. In some implementations, the one or more identifiers include a project identifier, an instance identifier, or a tag identifier. For example, a project identifier can reference a particular project that was created by a user. An instance identifier can reference a particular virtual machine instance. A tag identifier can reference a particular tag, e.g., "front-end webserver" or "sql server" with which one or more virtual machines instances are associated. In some implementations, users can specify custom identifiers that can be associated with key-value pairs. For example, a user can specify a machine-type identifier that can be associated with metadata key "hostname."

In some implementations, access to metadata that is associated with one or more identifiers is restricted to VM instances that are also associated with the one or more identifiers. For example, a VM instance that is associated with a project identifier P1 can access metadata associated with the project identifier P1 but not metadata associated with a project identifier P2. Similarly, similar tag identifiers can be associated with different project identifiers. Thus, for example, a first tag identifier "front-end webserver" can be associated with a project identifier P1 while a second tag identifier "front-end webserver" can be associated with a project identifier P2. In this example, metadata associated with the first tag identifier "front-end webserver" in the project P1 has no relation to metadata associated with the second tag identifier "front-end webserver" in the project P2. Thus, VM instances that are associated with the project identifier P1 cannot access metadata that is associated with the project identifier P2. Similarly, VM instances that are associated with the project identifier P2 cannot access metadata that is associated with the project identifier P1. This is a useful property for a multi-tenant system, as it ensures metadata remains confidential and is not visible to VM instances that are not associated with the proper identifiers.

The metadata server 130 is configured to receive user specified key-value pairs and their corresponding identifiers. In some implementations, the metadata server 130 categorizes and stores received key-value pairs in one or more metadata collections based on their respective identifiers. For example, a key-value pair that is associated with a project identifier P1 and a tag identifier T1 can be stored in a first metadata collection that corresponds to the project identifier P1 and a second metadata collection that corresponds to the tag identifier T1.

The metadata server 130 is also configured to receive queries from VM instances requesting metadata. Users can customize the configuration of VM instances running in the system 100 by associating the VM instances with one or more respective identifiers, e.g., a project identifier, an instance identifier, or a tag identifier, as described above. For example, a user can specify that a VM instance be associated with a project identifier P1, an instance identifier M1, and tag identifiers "sql server" and "front-end webserver." In some implementations, each VM instance can be associated with only one project identifier.

At startup, the VM instance can query the metadata server 130 to obtain metadata that is associated with the same identifiers that are associated with the VM instance. Thus, for example, a VM instance associated with a project identifier P1, an instance identifier M1, and tag identifiers "sql server" and "front-end webserver" can query the metadata server 130 to obtain metadata that is also associated with the project identifier P1, the instance identifier M1, and the tag identifiers "sql server" and "front-end webserver." In response to receiving the query, the metadata server 130 can identify metadata collections that respectively correspond to the project identifier P1, the instance identifier M1, and the tag identifiers "sql server" and "front-end webserver." The metadata server 130 can provide metadata that was categorized in the identified metadata collections to the VM instance. The VM instance can apply the received metadata to configure various settings associated with the VM instance.

For example, a user can associate a first metadata key "sshKeys" and corresponding value, e.g., "joe:ssh-rsa <SSH key>," that describes user accounts and corresponding public SSH keys, with a project identifier P1. The user can also associate a second metadata key "allowedHosts" and corresponding value, e.g., "192.0.2.24/30," that describes Internet Protocol (IP) addresses that are allowed to connect to a VM instance, with the project identifier P1. The user can then associate a third metadata key "startupScript" and corresponding value, e.g., a shell script that configures and starts a webserver, with a tag identifier "web." Finally, the user can associate a fourth metadata key "allowedHosts" and corresponding value, e.g., "0.0.0.0/0" that describes IP addresses that are allowed to connect to a VM instance, with an instance identifier "shell."

In some implementations, users can specify particular identifiers to be associated with one or more VM instances using an Application Programming Interface (API). A system component in each VM instance is configured to obtain the user specified identifiers, and to associate the identifiers with the respective VM instance.

A user can initialize a VM instance and can associate the VM instance with a project identifier P1 and an instance identifier "shell." At startup, the VM instance can query the metadata server 130 to obtain metadata that is associated with the project identifier P1 and the instance identifier "shell." In response to the query, the metadata server 130 can provide the VM instance with metadata associated with the project identifier P1, e.g., the first and second metadata key-value pairs, and metadata associated with the instance identifier "shell," e.g., the fourth metadata key-value pair. In some implementations, the metadata server 130 provides the VM instance with respective Uniform Resource Locator (URL) paths that reference the requested metadata. For example, the metadata server 130 can provide a first URL, e.g., "/v1beta/compute-metadata/project/attributes/sshKeys," that references the "sshKeys" key-value pair associated with the project identifier P1, a second URL, e.g., "/v1beta/computemetadata/project/attributes/allowedHosts," that references the "allowedHosts" key-value pair associated with the project identifier P1, and a third URL, e.g., "/v1beta/computemetadata/instance/attributes/allowedHosts," that references the "allowedHosts" key-value pair associated with the instance identifier "shell." The VM instance can then process the received metadata to configure the VM instance. In this example, if the user had associated the VM instance with a tag identifier "web," then the metadata server 130 would also provide the VM instance with a fourth URL, e.g., "/v1beta/computemetadata/tags/web/attributes/startupScript," that references the "startupScript" key-value pair associated with the tag identifier "web."

In some instances, a metadata conflict may arise when different values are specified for a metadata key that is associated with more than one metadata collection, e.g., with more than one identifier, and when a VM instance is associated with those identifiers. As described in the example above, the second metadata key "allowedHosts," which is associated with the project identifier P1, has a corresponding value "192.0.2.24/30" while the fourth metadata key "allowedHosts," which is associated with the instance identifier "shell," has a corresponding value "0.0.0.0/0." In this example, since the VM instance is associated with the project identifier P1 and the instance identifier "shell," there is a conflict as to whether the metadata value corresponding to the second metadata key "allowedHosts," e.g., "192.0.2.24/30," or the fourth metadata key "allowedHosts," e.g., "0.0.0.0/0," is used to configure the VM instance.

In some implementations, the metadata server 130 provides all conflicting metadata to the VM instance, and the VM instance itself determines which metadata value is used to configure the VM instance. In some implementations, the metadata server 130 determines which metadata key-value pair has a higher priority level by evaluating respective identifiers associated with the metadata key-value pairs, and provides to the VM instance the metadata key-value pair that is associated with the higher priority level. In some implementations, instance identifiers and tag identifiers are prioritized higher than project identifiers. In some implementations, instance identifiers are prioritized higher than both tag identifiers and project identifiers.

In some implementations, users can dynamically reconfigure VM instances by updating metadata collections. For example, a user can specify new metadata key-value pairs or the user can update metadata values for existing metadata keys. VM instances can be configured to automatically query the metadata server 130 to obtain the new or updated metadata, as described below in reference to FIG. 2. The VM instances can use the obtained metadata to reconfigure various settings associated with the VM instance.

In some implementations, each VM instance, e.g., VM 110, 112, or 114, is paired with a distinct metadata server, e.g., the metadata server 130. In some implementations, each host machine, e.g., host machines 102 or 104, is paired with a distinct metadata server, e.g., the metadata server 130. In some implementations, the metadata server, e.g., the metadata server 130, is configured as a distributed system.

Figure 2:
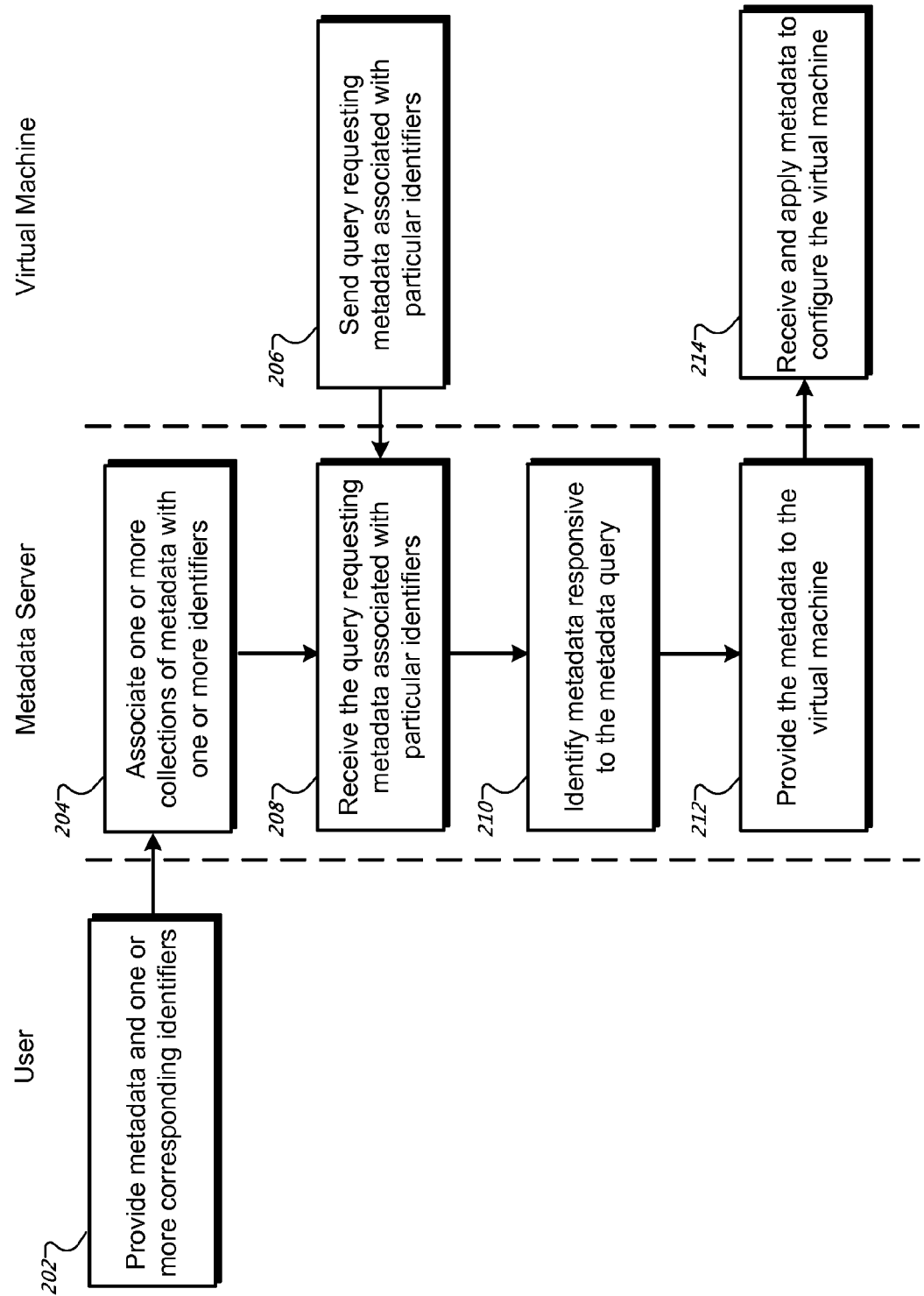
FIG. 2 is a swim lane diagram illustrating configuration of a virtual machine instance using pairings of metadata attributes with metadata values.

FIG. 2 is a swim lane diagram illustrating configuration of a virtual machine instance using pairings of metadata attributes with metadata values.

A user operating a user device provides metadata, e.g., key-value pairs, and one or more corresponding identifiers, to a metadata server, as described above (202). In some implementations, users can provide values for a metadata key, e.g., "attached-disks," to specify a list of ephemeral and persistent disks, and can associate the metadata with one or more identifiers to configure VM instances that are also associated with the one or more identifiers to use the identified ephemeral and persistent disks. Other examples of metadata for which users can provide customized values include a metadata key, e.g., "description," to specify a description of an instance, a metadata key, e.g., "domain," to specify a domain of a VM instance hostname, a metadata key, e.g., "hostname," to specify a host name for an instance, a metadata key, e.g., "image," to specify an image to be used for initializing a VM instance.

Additionally, users can provide customized values for a metadata key, e.g., "machine-type," that identifies a machine type, e.g., a machine having a particular number of Central Processing Units (CPUs) and memory configuration, a metadata key, e.g., "network," to specify network information, a metadata key, e.g., "zone," to specify a zone, e.g., time zone. Further, users can provide customized values for a metadata key, e.g., "sshKeys," to specify a list of Secure Shell (SSH) keys that can be used to connect to an instance, a metadata key, e.g., "startup-script," to specify a startup script to execute when an instance starts, a metadata key, e.g., "startup-script-url," to specify a URL (Uniform Resource Locator) of a startup script to execute when an instance starts.

The metadata server associates one or more metadata collections with respective identifiers (204). As described above, in some implementations, the metadata server categorizes and stores the received metadata into one or more respective metadata collections based on the identifiers corresponding to the received metadata. Thus, for example, the metadata server can categorize and store all received metadata that is associated with a particular project identifier, e.g., P1, into a first metadata collection, and can associate the first metadata collection with the particular project identifier, e.g., P1. Similarly, the metadata server can categorize and store all received metadata that is associated with a particular tag identifier, e.g., T1, into a second metadata collection, and can associate the second metadata collection with the particular tag identifier, e.g., T1.

A VM instance that is associated with particular identifiers sends a metadata query to the metadata server to obtain metadata that is also associated with the particular identifiers (206). In some implementations, a VM instance is configured to query the metadata server for metadata when the VM instance is initialized, e.g., at startup. In some implementations, a VM instance is configured to query the metadata server for metadata at specified time intervals, for example, as specified in a cron job.

In some implementations, a VM instance is configured to query the metadata server using a "Hanging GET" operation. For example, the VM instance can use the conventional hypertext transfer protocol (HTTP) "GET" operation to request metadata. In situations where the metadata server has already provided the VM instance with metadata, the VM instance can "hang," or maintain the HTTP "GET" connection, to continue waiting until the metadata server has new or updated metadata to provide the VM instance. In such implementations, if the HTTP "GET" connection is closed due to inactivity, e.g., a time out, the VM instance can be configured to re-establish the connection and continue waiting for new or updated metadata.

The metadata server receives the query requesting metadata associated with particular identifiers, as described above (208). The metadata server can communicate data, e.g., queries and metadata, using any appropriate network communications protocol or using conventional hypertext transfer protocol (HTTP) "GET" and "PUT" commands.

The metadata server identifies metadata responsive to the metadata query (210). The metadata server can identify one or more metadata collections that respectively correspond to the particular identifiers, as described above in reference to FIG. 1.

The metadata server provides the metadata responsive to the query to the VM instance (212). The metadata server can provide metadata that was categorized and stored in the identified metadata collections to the VM instance, as described above.

The VM instance receives and applies the metadata to configure the VM instance (214). In some implementations, the VM instance configures itself by updating a particular setting associated with the VM instance, for example, by updating data in a particular file. For example, the VM instance can receive a metadata key "hostname" and its corresponding value "example.com." Based on the key "hostname," the VM instance can be configured to update a particular file, e.g., "/etc/hostname," with the value "example.com." Upon updating the file "/etc/hostname," the VM instance can reinitialize its networking configuration so that the VM instance domain corresponds to "example.com."

Figure 3:
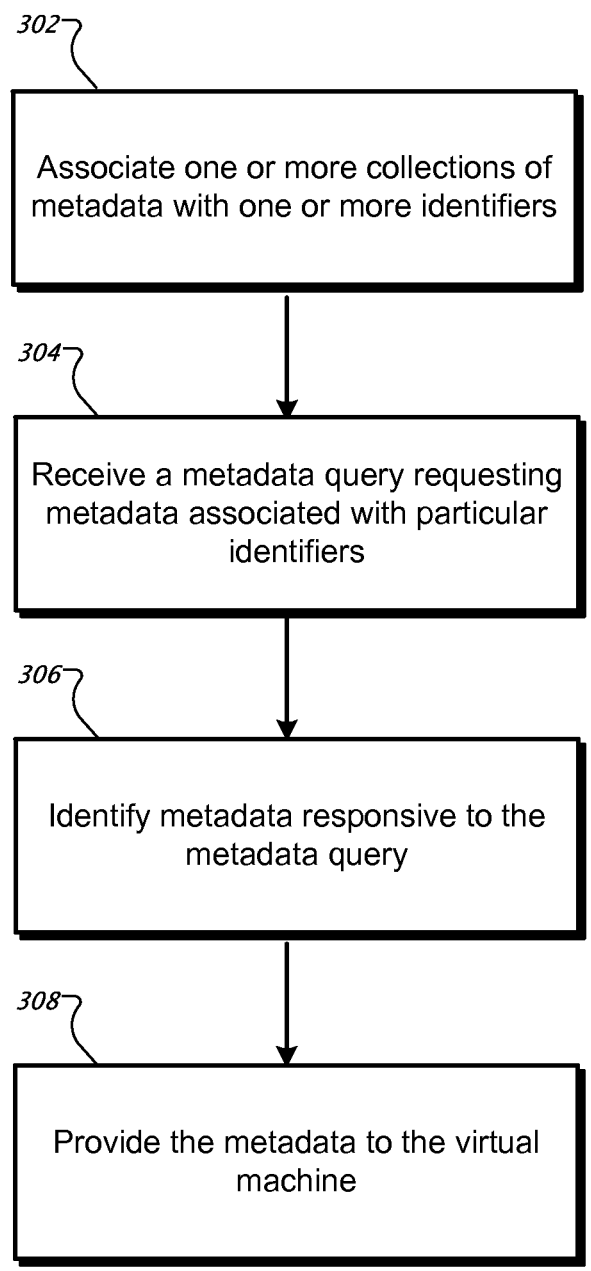
FIG. 3 is a flow diagram of an example process for configuring a virtual machine instance using pairings of metadata attributes with metadata values.

FIG. 3 is a flow diagram of an example process 300 for configuring a virtual machine instance using pairings of metadata attributes with metadata values. For convenience, the process 300 will be described with respect to a system, e.g., the metadata server 130, including one or more computing devices that performs the process 300.

The system associates one or more metadata collections with respective identifiers, as described above (302).

The system receives a metadata query requesting metadata associated with particular identifiers, as described above (304). For example, the system can receive the query from a VM instance that is also associated with the particular identifiers.

The system identifies metadata responsive to the metadata query, as described above (306).

They system provides the metadata to the VM instance, as described above (308).

FIG. 4 is a schematic diagram of an example host machine. The host machine 400 generally consists of a data processing apparatus 402. The data processing apparatus 402 can optionally communicate with one or more other computers 490 through a network 480. While only one data processing apparatus 402 is shown in FIG. 4, multiple data processing apparatus can be used in one or more locations. The data processing apparatus 402 includes various modules, e.g. executable software programs. One of the modules is the kernel 406 of a host operating system (e.g., host operating system 106). A virtual machine module 408 (e.g., virtual machine 110) includes virtual hardware (e.g., virtual hardware 110a), a guest operating system (e.g., guest operating system 110b), and guest applications (guest applications 110c). Although several software modules are illustrated, there may be fewer or more software modules. Moreover, the software modules can be distributed on one or more data processing apparatus connected by one or more networks or other suitable communication mediums.

The data processing apparatus 402 also includes hardware or firmware devices including one or more processors 412, one or more additional devices 414, a computer-readable storage medium 416, a communication interface 418, and optionally one or more user interface devices 420. Each processor 412 is capable of processing instructions for execution within the data processing apparatus 402. In some implementations, the processor 412 is a single or multi-threaded processor. Each processor 412 is capable of processing instructions stored on the computer-readable storage medium 416 or on a storage device such as one of the additional devices 414. The data processing apparatus 402 uses its communication interface 418 to communicate with one or more computers 490, for example, over a network 480. Examples of user interface devices 420 include a display, a camera, a speaker, a microphone, a tactile feedback device, a keyboard, and a mouse. The data processing apparatus 402 can store instructions that implement operations associated with the modules described above, for example, on the computer-readable storage medium 416 or one or more additional devices 414, for example, one or more of a floppy disk device, a hard disk device, an optical disk device, or a tape device.

FIG. 4 is also a schematic diagram of an example metadata server. The metadata server generally consists of one or more data processing apparatus in one or more locations. The data processing apparatus includes hardware or firmware devices including one or more processors, a computer readable storage medium, and a communication interface. Each processor is capable of processing instructions for execution within the data processing apparatus. In some implementations, the processor is a single or multi-threaded processor. Each processor is capable of processing instructions stored on the computer readable storage medium or on a storage device such as one of the additional devices. The data processing apparatus uses its communication interface to communicate with one or more computers, for example, over a network.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by one or more computing devices, the method comprising:
    associating each of a plurality of user-specified metadata key-value pairs with one or more respective identifiers of a plurality of identifiers, wherein each identifier is one of a project identifier, a tag identifier, or an instance identifier;
    receiving, by a metadata service from a virtual machine instance, a metadata query;
    obtaining identifier information associated with the virtual machine instance, wherein the identifier information specifies two or more identifiers of the plurality of identifiers;
    identifying, based on the identifier information associated with the virtual machine instance, one or more of the user-specified metadata key-value pairs that are each associated with at least one of the two or more identifiers specified by the identifier information associated with the virtual machine instance, the one or more metadata key-value pairs being key-value pairs to be provided to the virtual machine instance, and wherein the virtual machine instance is associated with all of the two or more identifiers that are specified in the identifier information; and
    providing, to the virtual machine instance, the identified one or more metadata key-value pairs in response to receiving the metadata query.

2. The method of claim 1, further comprising:
    receiving, from a user, the two or more identifiers for the virtual machine instance; and
    associating the virtual machine instance with each of the two or more identifiers received from the user.

3. The method of claim 2, wherein the metadata query is communicated using a Hanging GET operation.

4. The method of claim 1, further comprising:
    receiving data that includes one or more user-specified identifiers and one or more user-specified metadata key-value pairs; and
    associating the metadata key-value pairs with the one or more user-specified identifiers.

5. The method of claim 1, wherein each identifier corresponds to a collection of metadata key-value pairs.

6. The method of claim 1, further comprising:
    determining that the identified metadata key-value pairs include two conflicting metadata key-value pairs, the conflicting metadata key-value pairs including a first metadata key that is identical to a second metadata key, and a first metadata value that is different than a second metadata value, the first metadata key being paired with the first metadata value, and the second metadata key being paired with the second metadata value; and
    providing both the first metadata value and the second metadata value to the virtual machine instance, wherein the virtual machine instance resolves two conflicting metadata key-value pairs by selecting a value of one of the conflicting metadata key-value pairs.

7. The method of claim 1, further comprising:
    determining that the identified metadata key-value pairs include two conflicting metadata key-value pairs, the conflicting metadata key-value pairs including a first metadata key that is identical to a second metadata key, and a first metadata value being different than a second metadata value, the first metadata key being paired with the first metadata value and the second metadata key being paired with the second metadata value; and
    determining that the first metadata key is associated with a first identifier that has a higher priority level than a second identifier associated with the second metadata key; and
    in response to the determining, providing the first metadata value and not the second metadata value to the virtual machine instance.

8. The method of claim 7, wherein:
    the first identifier is an instance identifier or a tag identifier, and the second identifier is a project identifier; or
    the first identifier is an instance identifier, and the second identifier is a tag identifier or a project identifier.

9. The method of claim 1, wherein the virtual machine instance provides the metadata query to the metadata service upon startup of the virtual machine instance and configures one or more settings of the virtual machine instance according to the one or more received metadata key-value pairs.

10. A non-transitory computer storage medium encoded with instructions that when executed by one or more computers cause the one or more computers to perform operations comprising:
    associating each of a plurality of user-specified metadata key-value pairs with one or more respective identifiers of a plurality of identifiers, wherein each identifier is one of a project identifier, a tag identifier, or an instance identifier;
    receiving, by a metadata service from a virtual machine instance, a metadata query;
    obtaining identifier information associated with the virtual machine instance, wherein the identifier information specifies two or more identifiers of the plurality of identifiers;
    identifying, based on the identifier information associated with the virtual machine instance, one or more of the user-specified metadata key-value pairs that are each associated with at least one of the two or more identifiers specified by the identifier information associated with the virtual machine instance, the one or more metadata key-value pairs being key-value pairs to be provided to the virtual machine instance, and wherein the virtual machine instance is associated with all of the two or more identifiers that are specified in the identifier information; and
    providing, to the virtual machine instance, the identified one or more metadata key-value pairs in response to receiving the metadata query.

11. The computer storage medium of claim 10, further comprising:
    receiving, from a user, the two or more identifiers for the virtual machine instance; and
    associating the virtual machine instance with each of the two or more identifiers received from the user.

12. The computer storage medium of claim 11, wherein the metadata query is communicated using a Hanging GET operation.

13. The computer storage medium of claim 10, further comprising:
    receiving data that includes one or more user-specified identifiers and one or more user-specified key-value pairs; and
    associating the metadata key-value pairs with the one or more user-specified identifiers.

14. The computer storage medium of claim 10, wherein each identifier corresponds to a collection of metadata key-value pairs.

15. The computer storage medium of claim 10, wherein the operations further comprise:
- determining that the identified metadata key-value pairs include two conflicting metadata key-value pairs, the conflicting metadata key-value pairs including a first metadata key that is identical to a second metadata key, and a first metadata value that is different than a second metadata value, the first metadata key being paired with the first metadata value, and the second metadata key being paired with the second metadata value; and
- providing both the first metadata value and the second metadata value to the virtual machine instance, wherein the virtual machine instance resolves two conflicting metadata key-value pairs by selecting a value of one of the conflicting metadata key-value pairs.

16. The computer storage medium of claim 10, wherein the operations further comprise:
- determining that the identified metadata key-value pairs include two conflicting metadata key-value pairs, the conflicting metadata key-value pairs including a first metadata key that is identical to a second metadata key, and a first metadata value being different than a second metadata value, the first metadata key being paired with the first metadata value and the second metadata key being paired with the second metadata value; and
- determining that the first metadata key is associated with a first identifier that has a higher priority level than a second identifier associated with the second metadata key; and
- in response to the determining, providing the first metadata value and not the second metadata value to the virtual machine instance.

17. The computer storage medium of claim 16, wherein:
the first identifier is an instance identifier or a tag identifier, and the second identifier is a project identifier; or
the first identifier is an instance identifier, and the second identifier is a tag identifier or a project identifier.

18. The computer storage medium of claim 10, wherein the virtual machine instance provides the metadata query to the metadata service upon startup of the virtual machine instance and configures one or more settings of the virtual machine instance according to the one or more received metadata key-value pairs.

19. A system comprising:
one or more computers and one or more storage devices storing instructions that are operable, when executed by the one or more computers, to cause the one or more computers to perform operations comprising:
- associating each of a plurality of user-specified metadata key-value pairs with one or more respective identifiers of a plurality of identifiers, wherein each identifier is one of a project identifier, a tag identifier, or an instance identifier;
- receiving, by a metadata service from a virtual machine instance, a metadata query;
- obtaining identifier information associated with the virtual machine instance, wherein the identifier information specifies two or more identifiers of the plurality of identifiers;
- identifying, based on the identifier information associated with the virtual machine instance, one or more of the user-specified metadata key-value pairs that are each associated with at least one of the two or more identifiers specified by the identifier information associated with the virtual machine instance, the one or more metadata key-value pairs being key-value pairs to be provided to the virtual machine instance, and wherein the virtual machine instance is associated with all of the two or more identifiers that are specified in the identifier information; and
- providing, to the virtual machine instance, the identified one or more metadata key-value pairs in response to receiving the metadata query.

20. The system of claim 19, further comprising:
receiving, from a user, two or more identifiers for the virtual machine instance; and
associating the virtual machine instance with each of the two or more identifiers received from the user.

21. The system of claim 20, wherein the metadata query is communicated using a Hanging GET operation.

22. The system of claim 19, further comprising:
receiving data that includes one or more user-specified identifiers and one or more user-specified key-value pairs; and
associating the metadata key-value pairs with the one or more user-specified identifiers.

23. The system of claim 19, wherein each identifier corresponds to a collection of metadata key-value pairs.

24. The system of claim 19, wherein the operations further comprise:
- determining that the identified metadata key-value pairs include two conflicting metadata key-value pairs, the conflicting metadata key-value pairs including a first metadata key that is identical to a second metadata key, and a first metadata value that is different than a second metadata value, the first metadata key being paired with the first metadata value, and the second metadata key being paired with the second metadata value; and
- providing both the first metadata value and the second metadata value to the virtual machine instance, wherein the virtual machine instance resolves two conflicting metadata key-value pairs by selecting a value of one of the conflicting metadata key-value pairs.

25. The system of claim 19, wherein the operations further comprise:
- determining that the identified metadata key-value pairs include two conflicting metadata key-value pairs, the conflicting metadata key-value pairs including a first metadata key that is identical to a second metadata key, and a first metadata value being different than a second metadata value, the first metadata key being paired with the first metadata value and the second metadata key being paired with the second metadata value; and
- determining that the first metadata key is associated with a first identifier that has a higher priority level than a second identifier associated with the second metadata key; and
- in response to the determining, providing the first metadata value and not the second metadata value to the virtual machine instance.

26. The system of claim 25, wherein:
the first identifier is an instance identifier or a tag identifier and the second identifier is a project identifier; or
the first identifier is an instance identifier and the second identifier is a tag identifier or a project identifier.

27. The system of claim 19, wherein the virtual machine instance provides the metadata query to the metadata service upon startup of the virtual machine instance and configures one or more settings of the virtual machine instance according to the one or more received metadata key-value pairs.

* * * * *